United States Patent
Ban et al.

(10) Patent No.: US 10,769,453 B2
(45) Date of Patent: Sep. 8, 2020

(54) ELECTRONIC DEVICE AND METHOD OF CONTROLLING OPERATION OF VEHICLE

(71) Applicant: SAMSUNG ELECTRONICS CO., LTD., Suwon-si, Gyeonggi-do (KR)

(72) Inventors: Dae-hyun Ban, Seoul (KR); Seo-woo Jang, Seongnam-si (KR); Un-kyu Park, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 65 days.

(21) Appl. No.: 15/964,779

(22) Filed: Apr. 27, 2018

(65) Prior Publication Data
US 2018/0336423 A1  Nov. 22, 2018

Related U.S. Application Data

(60) Provisional application No. 62/506,732, filed on May 16, 2017.

(30) Foreign Application Priority Data

Aug. 1, 2017  (KR) .......................... 10-2017-0097814

(51) Int. Cl.
*G06K 9/00* (2006.01)
*B60W 50/14* (2020.01)
(Continued)

(52) U.S. Cl.
CPC .......... *G06K 9/00791* (2013.01); *B60W 50/14* (2013.01); *G06K 9/00805* (2013.01);
(Continued)

(58) Field of Classification Search
CPC .. G06K 9/00791; G06K 9/00805; G06N 3/08; G06N 3/084; G06N 3/0454;
(Continued)

(56) References Cited

U.S. PATENT DOCUMENTS 9,043,069 B1 * 5/2015 Ferguson .............. B60W 30/00
                                                             701/23
9,344,683 B1 * 5/2016 Nemat-Nasser ........ B60R 11/04
(Continued)

FOREIGN PATENT DOCUMENTS

CN        103996178    8/2014
CN         10457065    4/2015
(Continued)

OTHER PUBLICATIONS

Krixhevsky et al., "ImageNet Classification with Deep Convolutional Neural Networks", 2012, 9 pages.
(Continued)

*Primary Examiner* — Xuemei G Chen
(74) *Attorney, Agent, or Firm* — Nixon & Vanderhye P.C.

(57) ABSTRACT

An electronic device and method of controlling an operation of a vehicle are provided. The method includes obtaining a video sequence including a plurality of frames from a camera installed on the vehicle; detecting, from the plurality of frames, an object included in the plurality of frames; obtaining position information regarding the object with respect to each of the plurality of frames; determining whether an event related to driving of the vehicle has occurred by analyzing time-series changes in positions of the object in the plurality of frames; generating a notification message about the event based on a result of the determining; and outputting the generated notification message, wherein the detecting of the object, the obtaining of the position information, the determining of whether an event has occurred, and the generating of the notification message are performed using a plurality of learning models.

20 Claims, 12 Drawing Sheets

(51) Int. Cl.
 *G06N 3/04* (2006.01)
 *G06N 3/08* (2006.01)
(52) U.S. Cl.
 CPC ......... *G06N 3/0445* (2013.01); *G06N 3/0454* (2013.01); *G06N 3/08* (2013.01); *G06N 3/084* (2013.01); *B60W 2050/143* (2013.01); *B60W 2050/146* (2013.01)
(58) Field of Classification Search
 CPC ............... G06N 3/0445; B60W 50/14; B60W 2050/146; B60W 2050/143; G05D 1/00
 See application file for complete search history.

(56) References Cited

U.S. PATENT DOCUMENTS

| | | | |
|---|---|---|---|
| 9,346,167 B2* | 5/2016 | O'Connor | G06N 3/008 |
| 9,604,639 B2* | 3/2017 | Laur | B60W 30/0956 |
| 9,711,050 B2* | 7/2017 | Ansari | G08G 1/167 |
| 9,881,234 B2* | 1/2018 | Huang | G06K 9/6232 |
| 10,133,938 B2 | 11/2018 | Kim et al. | |
| 10,198,655 B2* | 2/2019 | Hotson | G06K 9/4604 |
| 10,255,510 B2* | 4/2019 | Yu | G06K 9/00805 |
| 10,558,891 B2* | 2/2020 | Wang | G06K 9/6202 |
| 2007/0073463 A1 | 3/2007 | Sherony et al. | |
| 2012/0281093 A1* | 11/2012 | Fong | B60Q 9/005 348/148 |
| 2013/0250113 A1 | 9/2013 | Bechtel et al. | |
| 2014/0169627 A1 | 6/2014 | Gupta | |
| 2014/0254872 A1* | 9/2014 | Guan | G06K 9/00624 382/103 |
| 2016/0065903 A1* | 3/2016 | Wang | B60R 11/04 348/148 |
| 2016/0099010 A1* | 4/2016 | Sainath | G10L 25/30 704/232 |
| 2016/0210383 A1 | 7/2016 | Alaniz et al. | |
| 2016/0358477 A1 | 12/2016 | Ansari | |
| 2017/0039856 A1 | 2/2017 | Park | |
| 2017/0076019 A1* | 3/2017 | Nallapa | G09B 9/04 |
| 2017/0109458 A1* | 4/2017 | Micks | G06F 3/0484 |
| 2017/0109625 A1 | 4/2017 | Dai et al. | |
| 2017/0113664 A1 | 4/2017 | Nix | |
| 2017/0132769 A1 | 5/2017 | Barron et al. | |
| 2017/0193310 A1* | 7/2017 | Yu | G06K 9/00201 |
| 2017/0193315 A1* | 7/2017 | El-Khamy | G06K 9/00892 |
| 2017/0255832 A1* | 9/2017 | Jones | G06N 3/0454 |
| 2017/0289405 A1* | 10/2017 | Agrawal | G06T 5/007 |
| 2018/0018524 A1* | 1/2018 | Yao | G06K 9/00362 |
| 2018/0075309 A1* | 3/2018 | Sathyanarayana | H04N 5/247 |
| 2018/0121795 A1* | 5/2018 | Kato | G06F 15/7867 |
| 2018/0126902 A1* | 5/2018 | Seo | B60Q 1/525 |
| 2018/0143646 A1* | 5/2018 | Suk | G05D 1/0253 |
| 2018/0157386 A1* | 6/2018 | Su | G06F 9/451 |
| 2018/0158189 A1* | 6/2018 | Yedla | G06T 7/11 |
| 2018/0165527 A1* | 6/2018 | Park | G06K 9/00805 |
| 2018/0173240 A1* | 6/2018 | Fang | B60W 30/09 |
| 2018/0181860 A1* | 6/2018 | Verbist | B60W 40/09 |
| 2018/0225808 A1* | 8/2018 | Chakraborty | H04N 7/183 |
| 2018/0241984 A1* | 8/2018 | Sun | G06N 3/08 |
| 2018/0253622 A1* | 9/2018 | Chen | G06N 3/0454 |
| 2018/0284785 A1* | 10/2018 | Berntorp | G05D 1/0214 |
| 2018/0341872 A1* | 11/2018 | Wang | G06N 3/0454 |
| 2019/0019087 A1* | 1/2019 | Fukui | G06K 9/00791 |
| 2019/0164290 A1* | 5/2019 | Wang | G06T 7/10 |
| 2019/0202451 A1* | 7/2019 | Hayamizu | B60R 11/02 |
| 2019/0220029 A1* | 7/2019 | Fukuhara | G05D 1/0251 |
| 2019/0220691 A1* | 7/2019 | Valpola | G06K 9/6256 |
| 2019/0279045 A1* | 9/2019 | Li | G06K 9/6228 |

FOREIGN PATENT DOCUMENTS

| | | |
|---|---|---|
| CN | 105628951 A | 6/2016 |
| KR | 10-2016-0071875 | 6/2016 |
| KR | 10-2017-0034226 | 3/2017 |

OTHER PUBLICATIONS

Ren et al., "Faster R-CNN:Towards real-time object detection with region proposal networks", Jan. 6, 2016, 14 pages.
Long et al., "Fully Convolutional Networks for Semantic Segmentation", 2015, 10 pages.
Badrinarayanan et al., "Segnet: A Deep Convolutional Encoder-Decoder Architecture for Image Segmentation", IEEE, Oct. 10, 2016, 14 pages.
Noh et al., "Learning Deconvolution Network for Semantic Segmentation", 2015, pp. 1520-1528.
Chen et al., "Semantic image segmentation with deep convolutional nets and fully connected CRFs", http://arxiv.org/abs/1412.7062 , http://arxiv.org/abs/1502.02734, 2015, 37 pages.
Yu et al., "Multi-scale context aggregation by dilated convolution", Apr. 30, 2016, 13 pages.
Donahue et al., "Long-term Recurrent Convolutional Networks for Visual Recognition and Description", 2015, pp. 2625-2634.
Search Report and Written Opinion dated Sep. 28, 2018 in counterpart International Patent Application No. PCT/KR2018/006982.
U.S. Appl. No. 15/979,915, filed May 15, 2018; Jang et al.
Ros, G., et al., "The Synthia Dataset: A Large Collection of Synthetic Images for Semantic Segmentation of Urban Scenes", IEEE CVPR 2016, pp. 3231-3243.
He, K., et al., "Deep Residual Learning for Image Recognition", arXiv, Dec. 10, 2015, pp. 1-12.
Long, J., et al., "Fully Convolutional Networks for Semantic Segmentation", IEEE CVPR, 2015, 10 pages.
Shah, S., et al., "Aerial Information and Robotics Platform", Microsoft Research, Feb. 15, 2017, 17 pages.
Search Report and Written Opinion dated Sep. 6, 2018 in counterpart International Patent Application No. PCT/KR2018/005524.
Wu, Bichen et al., "Squeeze Det: Unified, Small, Low Power Fully Convolutional Neural Networks for Real-Time Object Detection for Autonomous Driving," arXiv:1612.01051v1 [cs.CV], Dec. 4, 2016, pp. 1-12.
Jo, Yong-Ho et al., "Classifications of Driving Patterns Using a Supervised Learning Method for Human-Vehicle Interaction," The 1st International Conference on Human-Agent Interaction, Oral Session II-1-4, Aug. 2013, pp. 1-6.
Korean Notice of Allowance for KR Application No. 10-2018-0049405.
European Extended Search Report dated May 19, 2020 for EP Application No. 18842256.2.

* cited by examiner

FIG. 5

| TYPE OF EVENT | RISK OF DRIVING | CONTENT OF NOTIFICATION MESSAGE |
|---|---|---|
| ACCIDENT IS ANTICIPATED DUE TO INSUFFICIENT SAFETY DISTANCE | HIGH | PLEASE STEP ON BRAKE IMMEDIATELY |
| THERE IS WINDING ROAD AHEAD | MEDIUM | THERE IS A WINDING ROAD AHEAD, SO PLEASE BE AWARE |
| THERE IS AN ACCIDENT VEHICLE AHEAD | LOW | THERE IS AN ACCIDENT VEHICLE AHEAD, SO PLEASE CHANGE A LANE TO THE RIGHT |
| TRAFFIC LIGHT IS CHANGED FROM GREEN TO RED | HIGH | TRAFFIC LIGHT IS CHANGED, SO PLEASE STOP |
| TRAFFIC LIGHT IS CHANGED FROM RED TO GREEN | LOW | TRAFFIC LIGHT IS CHANGED, SO PLEASE DRIVE |

ELECTRONIC DEVICE AND METHOD OF CONTROLLING OPERATION OF VEHICLE

CROSS-REFERENCE TO RELATED APPLICATIONS

This application is based on and claims priority under 35 U.S.C. § 119 to U.S. Provisional Patent Application No. 62/506,732, filed on May 16, 2017, in the U.S. Patent and Trademark Office, and Korean Patent Application No. 10-2017-0097814, filed on Aug. 1, 2017, in the Korean Intellectual Property Office, the disclosures of which are incorporated by reference herein in their entireties.

BACKGROUND

1. Field

The disclosure relates to an electronic device and method of controlling an operation of a vehicle, and for example, to an electronic device and a method of providing a notification message notifying about an occurrence of an event related to driving of a vehicle according to position of an object in a plurality of frames.

2. Description of Related Art

Along with developments in multimedia technology and network technology, a user may receive various services using electronic devices. Along with developments in technologies applied to a vehicle, various methods of recognizing whether an event related to driving of a vehicle has occurred are being developed.

On the other hand, in autonomous driving technology, which requires a quick and accurate cognitive function, demand for a technology for determining whether an event related to driving of a vehicle has occurred more accurately with a limited amount of data and notifying a user via a notification message is increasing.

SUMMARY

An electronic device and method of providing a notification message about an occurrence of an event related to driving of a vehicle based on position of an object in a plurality of frames using a plurality of learning models are provided.

In accordance with an aspect of the disclosure, an electronic device for controlling an operation of a vehicle is provided, the electronic device including a memory configured to store at least one program; and at least one processor configured to provide a notification message by executing the at least one program, wherein the at least one program includes instructions, which when executed by the processor, cause the electronic device to perform operations comprising: obtaining a video sequence including a plurality of frames from a camera installed on the vehicle; detecting, from the plurality of frames, an object included in the plurality of frames; obtaining position information regarding the object with respect to each of the plurality of frames; determining whether an event related to driving of the vehicle has occurred by analyzing time-series changes in positions of the object in the plurality of frames; generating a notification message about the event based on a result of the determining; and outputting the generated notification message, wherein the detecting of the object, the obtaining of the position information, the determining of whether an event has occurred, and the generating of the notification message are performed using a plurality of learning models.

In accordance with another aspect of the disclosure, a method of controlling an operation of a vehicle is provided, the method including obtaining a video sequence including a plurality of frames from a camera installed on the vehicle; detecting, from the plurality of frames, an object included in the plurality of frames; obtaining position information regarding the object with respect to each of the plurality of frames; determining whether an event related to driving of the vehicle has occurred by analyzing time-series changes in positions of the object in the plurality of frames; generating a notification message about the event based on a result of the determining; and outputting the generated notification message, wherein the detecting of the object, the obtaining of the position information, the determining of whether an event has occurred, and the generating of the notification message are performed using a plurality of learning models.

In accordance with another aspect of the disclosure, there is provided a non-transitory computer readable recording medium having recorded thereon a computer program for implementing the above method.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a table illustrating how contents of a notification message are determined, according to an embodiment;

DETAILED DESCRIPTION

Figure 1:
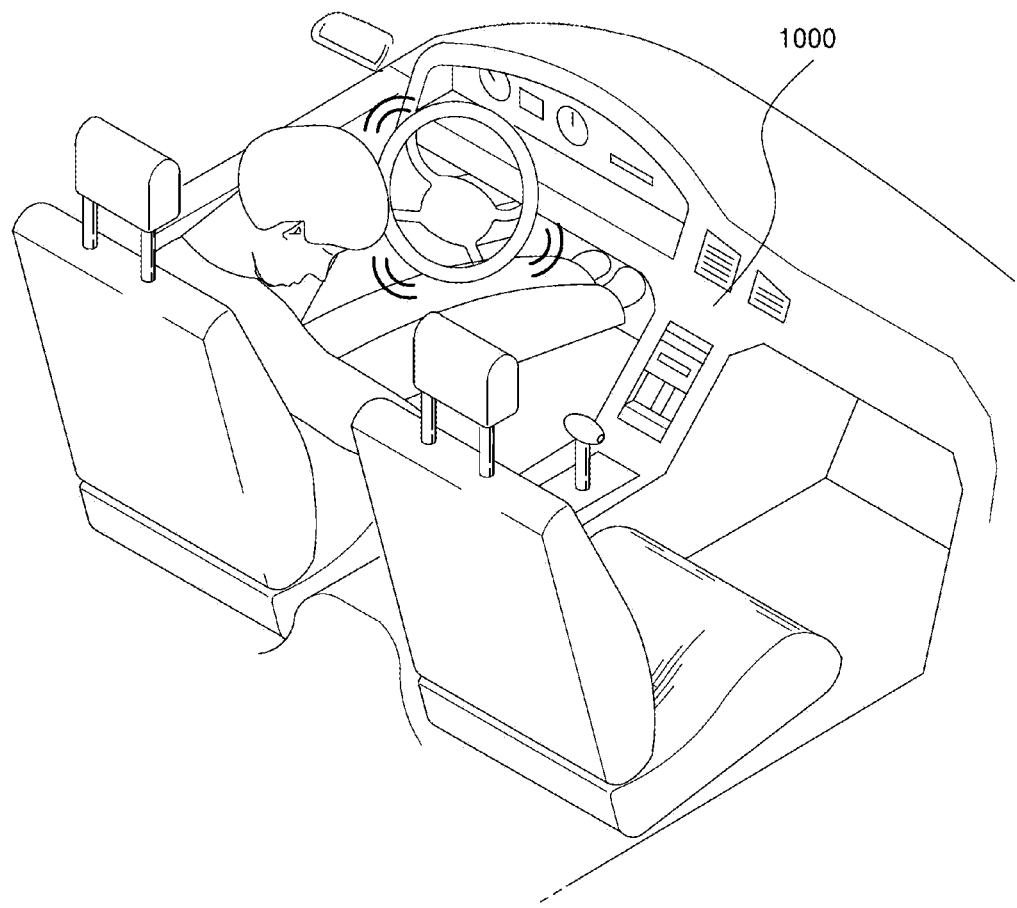
FIG. 1 is a diagram illustrating an example in which an electronic device according to an embodiment controls operation of a vehicle.

Reference will now be made in greater detail to various example embodiments, examples of which are illustrated in the accompanying drawings, wherein like reference numerals refer to like elements throughout. In this regard, the present embodiments may have different forms and should not be understood as being limited to the descriptions set forth herein. Therefore, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various example embodiments will be described more fully with reference to the accompanying drawings. The embodiments may, however, be embodied in many different forms and should not be understood as being limited to the embodiments set forth herein. Rather, the embodiments are provided so that this disclosure will be thorough and complete, and will fully convey the scope of the disclosure to those of skill in the art. In drawings, certain elements may be omitted for clarity, and like elements denote like reference numerals throughout the disclosure.

Throughout the disclosure, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, embodiments will be described in greater detail with reference to accompanying drawings.

FIG. 1 is a diagram illustrating an example in which an electronic device 1000 according to an embodiment controls operation of a vehicle.

Referring to FIG. 1, the electronic device 1000 may be a device installed on a vehicle, and the electronic device 1000 may receive a video sequence from a camera installed on the vehicle and transmit notification messages indicating occurrences of various events to a user.

Although it is described above that the electronic device 1000 receives a video sequence from a camera installed on the vehicle, the present disclosure is not limited thereto, and the electronic device 1000 may receive a video sequence from a camera capable of photographing a periphery of the vehicle. The periphery of the vehicle may include, for example, and without limitation, areas to the front, sides, and rear of the vehicle, or the like.

According to an embodiment, the electronic device 1000 may provide a notification message including different contents depending on types of events and risk level of driving. For example, when it is determined that it is desirable to provide an action guideline corresponding to an event instead of simply notifying the event based on the type of the event and a risk level of driving, a notification message including information regarding the event and an action guideline corresponding to the event may be provided to a user. For example, an action guideline corresponding to an event may include a method of reducing a risk level of driving.

According to an embodiment, when the electronic device 1000 determines that it is desirable to control an operation of a module installed on a vehicle based on a type of an event and a risk level of driving, the electronic device 1000 may transmit a command for controlling an operation of the module installed on the vehicle to the module installed on the vehicle. For example, the electronic device 1000 may output a notification message and control an operation of the module installed on the vehicle simultaneously, based on a type of an event and a risk level of driving. When a user input for controlling an operation of the module installed on the vehicle is not received within a certain time period after the electronic device 1000 output a notification message, the electronic device 1000 may transmit a command for controlling an operation of the module installed on the vehicle to the module installed on the vehicle. The electronic device 1000 may control an operation of the module installed on the vehicle without outputting a notification message, based on a type of an event and a risk level of driving.

The electronic device 1000 may be, for example, and without limitation, one or more of a head unit in a vehicle, an embedded board, a smart phone, a tablet PC, a PC, a smart TV, a mobile phone, a personal digital assistant (PDA), a laptop computer, a vehicle, a media player, a micro server, a global positioning system (GPS) device, an electronic book terminal, a digital broadcast terminal, a navigation device, a kiosk, an MP3 player, a digital camera, a consumer electronic device, and other mobile or non-mobile computing devices, or the like, but is not limited thereto. Furthermore, the electronic device 1000 may be a wearable electronic device, such as, for example, and without limitation, a watch, an eyeglass, a hair band, and a ring, having a communication function and a data processing function, or the like, but is not limited thereto. The electronic device 1000 may include any types of devices capable of obtaining an image (e.g., a video and a still image) from a camera and providing a notification message to a user based on the obtained image.

According to an embodiment, the electronic device 1000 may, for example, include a module installed on a vehicle, may control operations of the vehicle, and may communicate with other modules installed on the vehicle via a certain network.

According to an embodiment, the electronic device 1000 may, for example, include a device separate from a vehicle, such as a smart phone, or the like, but is not limited thereto. In this case, the electronic device 1000 may obtain a video sequence using a camera of the electronic device 1000 or may receive a video sequence from a camera capable of photographing the periphery of the vehicle via a certain network. Furthermore, when the electronic device 1000 is a device separate from the vehicle, the electronic device 1000 may communicate with a module installed on the vehicle to control operations of the vehicle.

The vehicle may, for example, and without limitation, be a means of transportation having communication function, data processing function, and transportation function, e.g., a car, a bus, a truck, a learn, a bicycle, a motorcycle, or the like, but is not limited thereto.

Furthermore, the electronic device 1000 may communicate with a server 2000 or another electronic device (not shown) via a certain network, to, for example, and without limitation, receive a video sequence, to transmit a notification message, and to transmit a command for controlling an operation of the other electronic device, or the like. In this case, the certain network may, for example, include a general data communication network that allows network components to communicate smoothly with one another and includes a local area network (LAN), a wide area network (WAN), a value added network (VAN), a mobile radio communication network, a satellite communication network, and mutual combinations thereof and may include a wired Internet, a wireless Internet, and a wireless communication network, or the like, but is not limited thereto. The wireless communication network may include, but is not limited to, Wi-Fi, Bluetooth, Bluetooth Low Energy, Zig- Bee, Wi-Fi Direct (WFD), ultra wideband (UWB), infrared data association (IrDA), and Near Field Communication (NFC).

Figure 2:
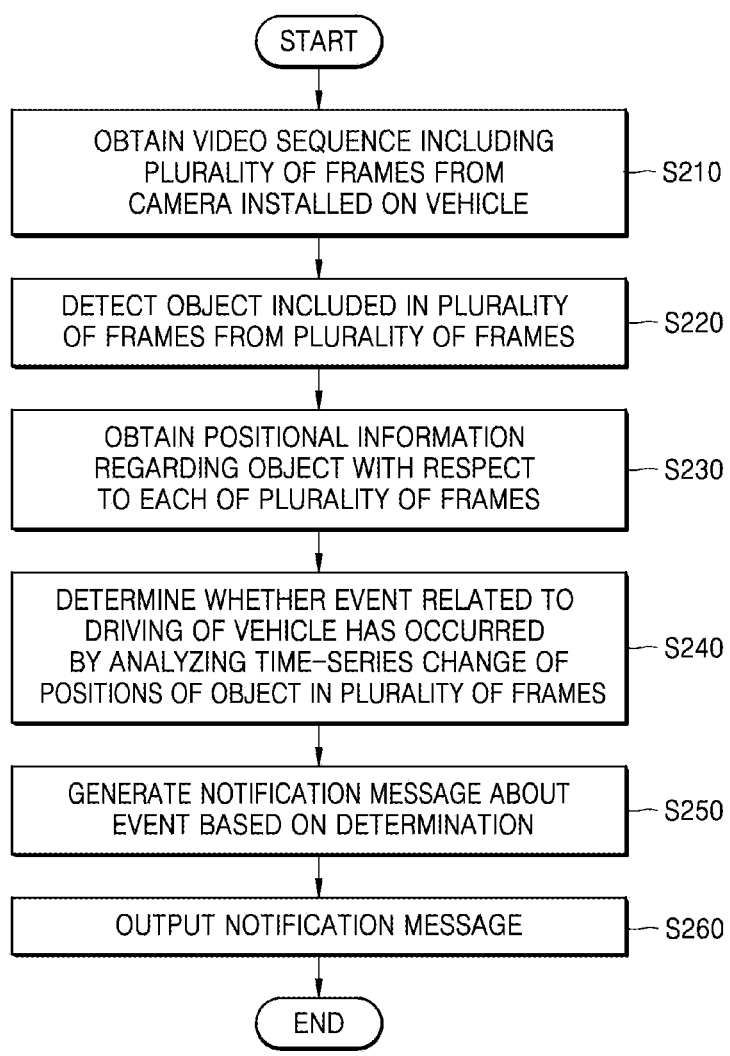
FIG. 2 is a flowchart illustrating a method by which an electronic device provides a notification message to a user, according to an embodiment.

FIG. 2 is a flowchart illustrating an example method by which the electronic device 1000 provides a notification message to a user, according to an embodiment.

In operation S210, the electronic device 1000 may obtain a video sequence including a plurality of frames from a camera installed on a vehicle. According to an embodiment, the electronic device 1000 may receive a video sequence by communicating with a camera installed on a vehicle via a certain network. For example, the video sequence may be a black box image of the vehicle or an image received from a stereo camera of the vehicle. According to an embodiment, the electronic device 1000 may include a camera, and a video sequence may be obtained from the camera included in the electronic device 1000.

A video sequence may include a series of still images. Each still image may be referred to as either a picture or a frame.

In operation S220, the electronic device 1000 may detect an object included the plurality of frames from the plurality of frames included in the video sequence. According to an embodiment, the electronic device 1000 may detect one or more objects from one frame included in the video sequence. One or more objects detected from one frame may be detected in another frame included in the same video sequence. One or more objects detected from one frame may not be detected in another frame included in the same video sequence. For example, a road, a sidewalk, a first vehicle, a second vehicle, a third vehicle, and a traffic sign may be detected from a first frame of a video sequence, whereas only the road, the sidewalk, the first vehicle, and the third vehicle may be detected from a second frame of the same video sequence and the second vehicle and the traffic sign may not be detected from the second frame. Furthermore, a motorcycle, which is not detected from the first frame, may be detected from the second frame.

According to an embodiment, the electronic device 1000 may determine a type of an object.

Types of an object may include, for example, and without limitation, a road, a sidewalk, a building, a wall, a fence, a pole, a traffic light, a traffic sign, vegetation, a terrain, the sky, a person, a rider, a car, a truck, a bus, a learn, a motorcycle, a bicycle, or the like.

For example, the electronic device 1000 may detect a plurality of objects from one frame and determine respective types of the plurality of objects. Furthermore, the electronic device 1000 may distinguish objects of a same type even when some of the plurality of objects are objects of a same type. For example, when three vehicles are detected in one frame, the electronic device 1000 may distinguish the three vehicles from one another as a first vehicle, a second vehicle, and a third vehicle.

According to an embodiment, the electronic device 1000 may use a first learning model to detect objects included in a frame. When frames obtained from a video sequence are input to the first learning model, information regarding the objects detected from the frames may be output from the first learning model. An operation for detecting an object using the first learning model will be described below with reference to FIG. 3.

In operation S230, the electronic device 1000 may obtain positional information regarding objects for each of the plurality of frames included in the video sequence.

According to an embodiment, the electronic device 1000 may determine respective positions of an object in the plurality of frames to obtain positional information regarding the object. For example, the electronic device 1000 may determine a position of an object in one frame. For example, the electronic device 1000 may determine a position of the object in another frame. Furthermore, for example, the electronic device 1000 may determine positions of a plurality of objects in one frame. For example, the electronic device 1000 may determine positions of the plurality of objects in another frame. Therefore, the electronic device 1000 may determine positions of the plurality of objects in each of the plurality of frames.

According to an embodiment, the electronic device 1000 may determine positions of an object on the pixel-by-pixel basis. For example, the electronic device 1000 may determine pixels indicating an object from among pixels of a frame. For example, when one frame includes a plurality of objects, the electronic device 1000 may determine pixels representing each of the plurality of objects. For example, the electronic device 1000 may determine a detected object indicated by one or more arbitrary pixels from among pixels of a frame.

The method by which the electronic device 1000 precisely obtains positional information regarding an object on the pixel-by-pixel basis instead of a bounding box may be applied to a technical field demanding accurate cognitive functions. For example, the electronic device 1000 may obtain positional information regarding an object on the pixel-by-pixel basis, thereby analyzing a change of the position of the object in a time-series manner. Therefore, the electronic device 1000 may be applied to an autonomous driving technique demanding fast and accurate cognitive function.

According to an embodiment, the electronic device 1000 may use a first learning model to obtain positional information regarding an object. When a plurality of frames are input to the first learning model, pixel information may be output from the first learning model. The pixel information may be information regarding objects respectively indicated by groups of pixels of a frame. Although the operation S220 and the operation S230 have been described above as separate operations, the present disclosure is not limited thereto. For example, when a plurality of frames are input to the first learning model, information regarding an object detected from the plurality of frames and pixel information may be output together. For example, only pixel information may be output. An operation for obtaining positional information regarding an object using the first learning model will be described below with reference to FIG. 3.

In operation S240, the electronic device 1000 may determine whether an event related to driving of the vehicle has occurred by analyzing time-series changes of positions of the objects in the plurality of frames.

According to an embodiment, the electronic device 1000 may analyze a position change of an object from a previous frame to a next frame according to a display order of a video sequence. For example, the electronic device 1000 may compare positional information regarding an object included in a first frame with positional information regarding the same object included in a second frame, which is reproduced later than the first frame, thereby analyzing a position change of the object. For example, the electronic device 1000 may determine whether an event has occurred by analyzing respective position changes of a plurality of objects according to the lapse of time. Therefore, the electronic device 1000 may more accurately determine whether an event has occurred based on composite recognition of changes of position of a plurality of objects that are determined on the pixel-by-pixel basis instead of tracking bounding boxes regarding a region of interest (ROI). For example, when a first vehicle and a second vehicle are stopped forward, and a third vehicle, a fourth vehicle, and a fifth vehicle successively change lanes to the right, the electronic device 1000 may determine that an event involving an accident between vehicles up ahead has occurred. Furthermore, since there are vehicles in an accident up ahead, an action guideline indicating that it is desirable to change a lane to the right may be determined in correspondence to the event.

According to an embodiment, the electronic device 1000 may determine the type of an event by analyzing the time-series changes of positions of objects in a plurality of frames.

Types of an event related to driving of a vehicle may include, but is not limited to, a traffic signal change, a possible accident, a road situation change, and a terrain change, or the like. An example of a traffic signal changes may be that a traffic light changes from green to red or from red to green. Examples of a possible accident may include insufficient safety distances to a vehicle in front and/or a vehicle behind, an appearance of an unexpected person, etc. An example of a road situation change may be that a road is blocked due to an accident vehicle ahead. An example of a terrain change may include a winding road ahead, a hill ahead, or the like.

According to an embodiment, the electronic device 1000 may determine a risk level of driving by analyzing time-series changes of positions of objects in a plurality of frames.

For example, a risk level of driving may be indicated by a numerical value. The higher a numerical value, the higher a risk level of driving may be. For example, a risk level of driving may be indicated by an integer between 1 and 100, and the electronic device 1000 may be configured to include a risk level of driving in a notification message when the risk level of driving is equal to or greater than a critical value. Furthermore, for example, a risk level of driving may be indicated as high, middle, and low.

According to an embodiment, the electronic device 1000 may use a second learning model to determine when an event has occurred. When pixel information output from the first learning model is input to the second learning model, information indicating whether an event has occurred may be output. An operation for determining whether an event has occurred using the second learning model will be described below with reference to FIG. 3.

In operation S250, the electronic device 1000 may generate a notification message about an event based on the determination of an occurrence of the event.

According to an embodiment, different notification messages may be generated depending on factors including types of an object, time-series changes of the position of the object, and an occurrence of an event.

When it is determined in the operation S240 that an event has occurred, in the operation S250, electronic device 1000 may generate a notification message about the event. Furthermore, when it is determined in the operation S240 that no event has occurred, in the operation S250, the electronic device 1000 may not generate a notification message about an event. According to an embodiment, when the electronic device 1000 decides not to generate a notification message about an event, the electronic device 1000 may generate no notification message or may generate a pre-set notification message including no notification of an event. For example, the electronic device 1000 may generate a notification message that includes at least one of a current temperature, an rpm of a vehicle, a moving direction of the vehicle, a traffic situation, and a risk level of driving. According to an embodiment, a notification message that does not include an event notification may be set to a default value in the electronic device 1000.

According to an embodiment, the electronic device 1000 may generate a notification message based on a type of an event and a risk level of driving. A method by which the electronic device 1000 determines content of a notification message based on the type of an event and a risk level of driving will be described below with reference to FIG. 5.

A notification message according to an embodiment may be generated as a text message or a voice message, or the like, but is not limited thereto. Furthermore, for example, a notification message generated in the form of a text message may be Text-to-Speech converted, thereby obtaining a voice notification message.

When pixel information output from the first learning model is input to the second learning model, a notification message may be output. Although the operation S240 and the operation S250 are described above as separate operations, the present disclosure is not limited thereto. For example, when pixel information is input to the first learning model, information indicating whether an event has occurred and a notification message may be output together. Only a notification message may be output. An operation for generating a notification message using the second learning model will be described below with reference to FIG. 3.

According to an embodiment, an operation for detecting an object, an operation for obtaining positional information regarding the object, an operation for determining whether an event has occurred, and an operation for generating a notification message may be performed using a plurality of learning models.

In operation S260, the electronic device 1000 may output a generated notification message.

According to an embodiment, a notification message may be output in the form of a sound, a text, an image, and/or a vibration, or the like, but is not limited thereto.

According to an embodiment, the electronic device 1000 may display a notification message on a head-up display (HUD) or a dashboard of a vehicle, or the like, but is not limited thereto.

According to an embodiment, the electronic device 1000 may output a notification message through a speaker of a vehicle when the notification message is in the form of a voice. For example, the electronic device 1000 may transmit a command for controlling the speaker of the vehicle to output a notification message in the form of a voice to the speaker of the vehicle.

According to an embodiment, based on a type of an event and a risk level of driving, a command for controlling an operation of a module installed on a vehicle may be transmitted to the corresponding module. When the electronic device 1000 determines that it is desirable to control an operation of the module installed on the vehicle based on the type of an event and a risk level of driving, the electronic device 1000 may transmit a command for controlling an operation of the module installed on the vehicle to the module installed on the vehicle. For example, the electronic device 1000 may output a notification message and control an operation of the module installed on the vehicle simultaneously, based on the type of an event and a risk level of driving. When a user input for controlling an operation of the module installed on the vehicle is not received within a certain time period after a notification message is output, the electronic device 1000 may transmit a command for controlling an operation of the module installed on the vehicle to the module installed on the vehicle. The electronic device 1000 may transmit a command for controlling an operation of the module installed on the vehicle to the module installed on the vehicle without outputting a notification message, based on the type of an event and a risk level of driving.

A user input according to an embodiment may include, but is not limited to, at least one of a step-on input, a steering input, a voice input, a key input, a touch input, a bending input, and a multimodal input, or the like. The step-on input may refer to an input applied as a user steps on a brake to control a vehicle's brake. The steering input may refer to an input applied as a user rotates a steering wheel to control a vehicle's steering.

Figure 3:
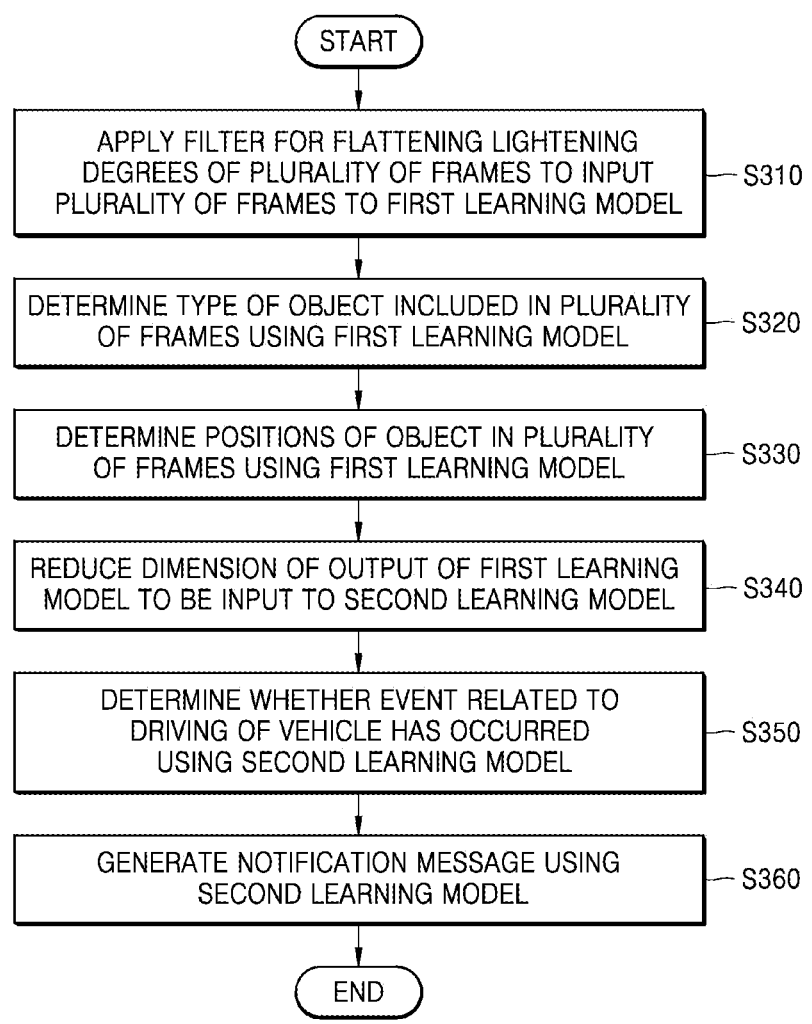
FIG. 3 is a flowchart illustrating a method by which an electronic device provides a notification message to a user by using a learning model, according to an embodiment.

FIG. 3 is a flowchart illustrating an example method by which an electronic device 1000 provides a notification message to a user using a learning model, according to an embodiment.

In operation S310, the electronic device 1000 may apply a filter to a plurality of frames to flatten lightening degrees of a plurality of frames for inputting a plurality of frames to a first learning model.

The first learning model may, for example, and without limitation, be generated by learning criteria for determining types of an object and learning criteria for determining positions of an object in a plurality of frames using a fully convolutional network (FCN).

According to an embodiment, the electronic device 1000 may convert RGB channels of a frame into a luminance-chromatic (Lab) channel. The L value of the converted Lab channel is a luminance value of the image, which is a value indicating the brightness of an image excluding color information. The electronic device 1000 may perform preprocessing to apply a median filter for flattening L values of a plurality of frames included in a video sequence to the plurality of frames before inputting a plurality of frames to the first learning model. By performing a preprocessing, an object may be detected more easily even when it is dark or rainy, and a plurality of objects may be distinguished from one another.

In operation S320, the electronic device 1000 may determine the type of an object included in the plurality of frames using the first learning model.

For example, the electronic device 1000 may detect a plurality of objects from one frame and determine the type of each of the plurality of objects using the first learning model. For example, when one frame is input to the first learning model, different values may be output depending on types of objects included in the frame. For example, in the first learning model, the sky may be set to a value 12, a plant may be set to a value 10, a road may be set to a value 4, a sidewalk may be set to a value 3, a vehicle may be set to a value 6, and a person may be set to a value 8. For example, when an input frame includes a plant, a road, a vehicle, a vehicle, and a person, an output of the first learning model may include values 4, 6, 8, and 10. Therefore, objects included in a frame may be detected using the first learning model. Furthermore, for example, when a frame is input to the first learning model, a value corresponding to the type of an object may not be output, and pixel information regarding respective objects indicated by groups of pixels of the frame may be output. The pixel information may be a matrix in which values corresponding to the types of an object are matched to positions of the object in a frame.

In operation S330, the electronic device 1000 may determine respective positions of an object in the plurality of frames using the first learning model.

According to an embodiment, the electronic device 1000 may determine not only the type of an object, but also the positions of the object in a plurality of frames using the first learning model. For example, the electronic device 1000 may determine the position of an object on the pixel-by-pixel basis using the first learning model. For example, since an electronic device 1000 may determine certain pixels of the frame indicating respective objects, when a frame is input to the first learning model, a matrix in which values corresponding to the types of an object are matched to positions of the object in the frame may be output. Since positions of an object are determined on the pixel-by-pixel basis, when the size of the frame is, for example, 512×256, the size of a matrix may also be 512×256. In other words, as an output of the first learning model corresponding to input of a frame, a matrix including information regarding the type of an object and positional information regarding the object may be obtained.

In operation S340, the electronic device 1000 may reduce the dimension of an output of the first learning model to input the same to a second learning model.

The second learning model may be generated by learning criteria for determining whether an event related to driving of a vehicle has occurred and criteria for determining the content of a notification message by analyzing time-series changes of positions of an object in a plurality of frames using, for example, and without limitation, a recurrent neural network (RNN).

According to an embodiment, an output of the first learning model may be used as an input to the second learning model. According to another embodiment, the electronic device 1000 may user a matrix obtained by reducing the dimension of a matrix output from the first learning model as an input to the second learning model for reducing amounts of calculations of the second learning model for determining whether an event has occurred and generating a notification message. For example, and without limitation, to reduce the dimension of a matrix, a dilated convolution may be used.

Furthermore, according to an embodiment, to reduce amounts of calculations of the first learning model, the electronic device 1000 may, for example, perform 1×1 convolutional filtering on outputs of layers included in the first learning model, thereby matching dimensions between the layers included in the first learning model.

In operation S350, the electronic device 1000 may use the second learning model to determine when an event related to driving of a vehicle has occurred.

According to an embodiment, when a first vehicle and a second vehicle are stopped forward and a third vehicle, a fourth vehicle, and a fifth vehicle successively change lanes to the right, the electronic device 1000 may determine that an event corresponding to accident vehicles ahead has occurred. Furthermore, since there are accident vehicles ahead, an action guideline indicating that it is desirable to change a lane to the right may be determined in correspondence to the event.

As described above, since the electronic device 1000 may obtain information regarding types objects and positional information regarding the objects in an entire screen image with small calculation amounts using the first learning model, time-series changes of positions of the objects may be quickly and accurately analyzed without setting a region of interest (ROI) unlike as a method of tracking an object.

Therefore, the electronic device 1000 may use the second learning model to determine an occurrence of an event that may be detected by analyzing time-series positional changes of an object in addition to events associated with driving of a vehicle. For example, the electronic device 1000 may generate subtitles in real time during reproduction of a movie using the second learning model.

In operation S360, the electronic device 1000 may generate a notification message using the second learning model.

According to an embodiment, when an output of the first learning model is processed to reduce calculation amounts and input to the second learning model, a notification message may be output. A control operation corresponding to an event may be output or a control operation corresponding to an event may be output together with a notification message.

According to an embodiment, a notification message generated using the second learning model may differ depending on types of an event and risks of driving. For example, depending on types of an event and risks of driving, contents included in a notification message may vary. For example, contents included in a notification message may include a notification of an event, an action guideline corresponding to the event, an alarm sound, or the like. For example, when there are accident vehicles ahead, the electronic device 1000 may include a notification of an event and an action guideline corresponding to the event in a notification message, thereby generating a notification message "There are accident vehicles ahead, so please change a lane to the right."

Contents included in a notification message will be described in greater detail below with reference to FIG. 5.

Figure 4:
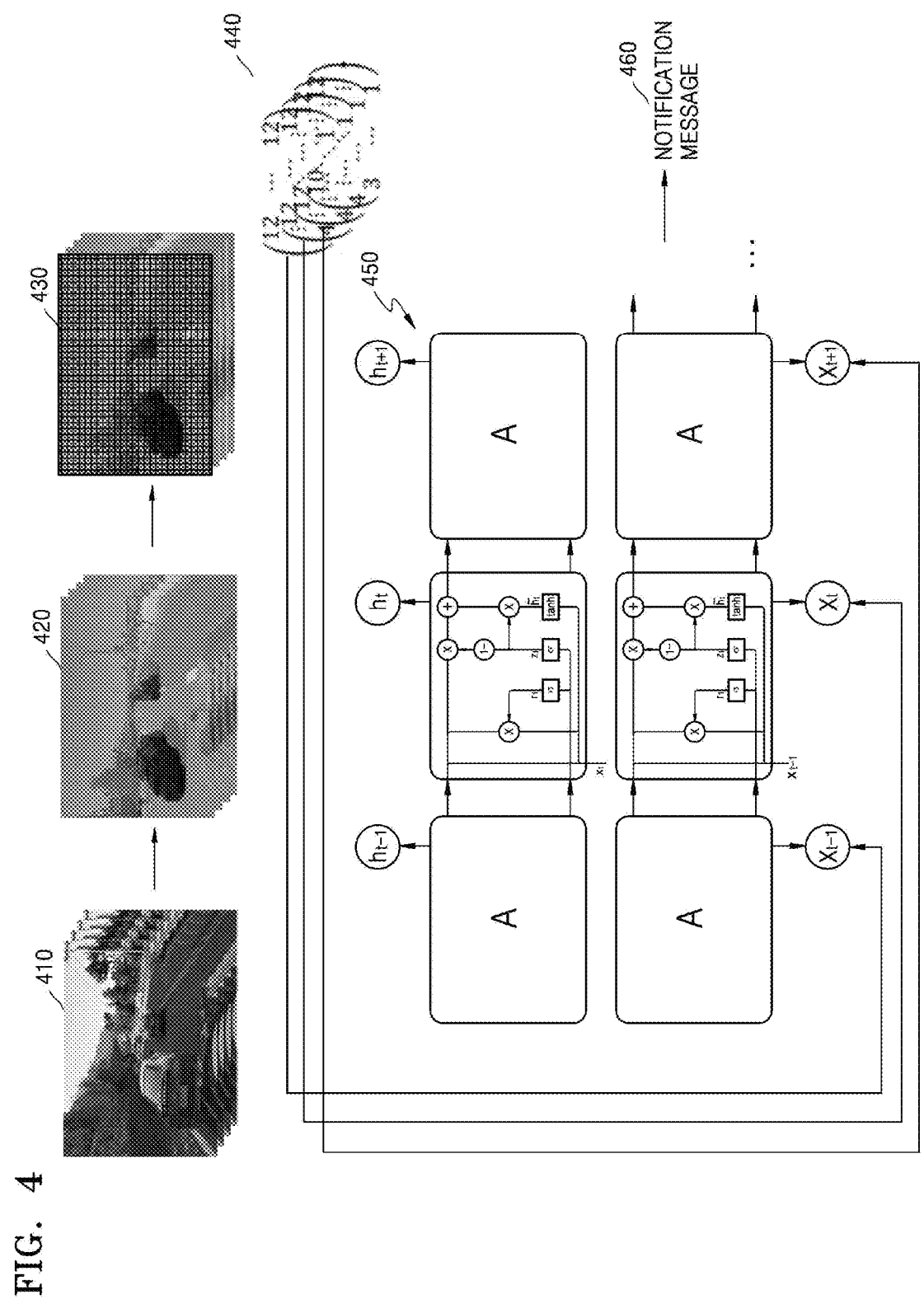
FIG. 4 is a diagram illustrating an example of generating a notification message using a learning model, according to an embodiment.

FIG. 4 is a diagram illustrating an example of generating a notification message by using a learning model, according to an embodiment.

A convolutional neural network (CNN), for example, includes a fully connected layer in a rear layer to classify class of image data. When an input image passes through the fully connected layer, positional information regarding objects included in the input image disappears. To resolve the problem, a fully convolutional network (FCN) considers the fully connected layer of a CNN as 1×1 convolution, thereby retaining positional information of objects included in an input image.

According to an embodiment, the electronic device 1000 may input a video sequence 410 preprocessed for leveling the brightness to a first learning model. Since the first learning model uses a FCN, when the video sequence 410 is input to the first learning model, a series of matrices including information regarding types of objects and positional information regarding the objects may be output. According to an embodiment, the video sequence 410, which has been preprocessed to be input to the first learning model, may be input to the first learning model in the order of their reproduction. An output in which matrices are output from the first learning model may be the identical to the order in which the video sequence 410 is input to the first learning model.

When a series of matrices output from the first learning model are imaged, a video sequence 420 indicated by different colors according to types of objects included in the video sequence 410 may be obtained. When dilated convolution is performed in a video sequence 430 obtained by dividing the video sequence 420 into pixels, a matrix 440, which has a dimension reduced from that of a matrix output from the first learning model, may be obtained. The dilated convolution is a method of performing convolution using only some of pixels included in the video sequence 430. For example, by skipping one or more pixel and performing convolution, the size of a matrix and calculation amounts may be reduced by extending the size of a receptive field (RF).

According to an embodiment, when the matrix 440 is input to the second learning model, a notification message 460 may be output. The second learning model is based, for example, on a recurrent neural network (RNN) where a neural network with recurrent connections between nodes in different time sections is referred to as the RNN. A RNN according to an embodiment may recognize sequential data. The sequential data is data with temporality or a sequence, such as voice data, image data, biometric data, and handwriting data. For example, the recognition model of the RNN may recognize a pattern according to which input image data changes.

The RNN may be learned through supervised learning in which learning data and output data corresponding thereto are input to a neural network together and connection weights of connection neurons are updated so as to output output data corresponding to the learning data. For example, the RNN may update connection weights between neurons based on delta rules and backpropagation learning.

The RNN may be a structure including a long short-term memory (LSTM) network 450. The LSTM network 450 is a type of RNN supporting long-term dependency learning. In an RNN that does not include the LSTM network 450, information regarding a previous task may be connected to a current task, but it is difficult to connect information regarding a previous task corresponding to a time point far from a current time point to a current task. The LSTM network 450 may be a structure designed to avoid such a long-term dependency problem. Since the LSTM network 450 may extract a relative amount of change that varies according to the lapse of time from input data as a feature value, it may be determined whether an event has occurred by analyzing a time-series change of positions of an object.

Since the second learning model uses the RNN including the LSTM network 450, structures for all of a previous time step, a current time step, and a next time step may be used for learning, and information regarding a current stage may be forwarded to a next stage and influences an output value.

According to an embodiment, the matrices 440 obtained by reducing the dimension of an output of the first learning model may be input to the second learning model in the order that the matrix 440 is output from the first learning model. The second learning model may generate a notification message by taking an occurrence of an event, the type of the event and a risk level of driving into account.

For convenience of explanation, the first learning model and the second learning model have been described separately. However, the first learning model and the second learning model may exist as a plurality of learning models or a single integrated learning model according to their functions and roles.

FIG. 5 is a table illustrating how contents of a notification message are determined, according to an embodiment.

Referring to FIG. 5, a table 500 indicates how contents of a notification message are determined according to the type of an event and a risk level of driving. The table 500 according to an embodiment is merely an example, and a plurality of learning models may be continuously updated. Therefore, output values according to input values to the plurality of learning models may be continuously updated. The electronic device 1000 may use a second learning model to output different notification messages depending on types of an event and risks of driving. For example, as shown in FIG. 5, when the type of an event is a possible accident due to an insufficient safety distance to a vehicle in front and a risk level of driving is high, the electronic device 1000 may generate a notification message including an alarm sound and an action guideline "please step on the brake immediately" corresponding to the event. Furthermore, according to an embodiment, the electronic device 1000 may determine, based on the type of an event and a risk level of driving, a time period during which a user input for performing an action guideline may be received. For example, a time period during which a user input may be received may be determined based on a risk level of driving. Furthermore, for example, data for determining a time period during which a user input may be received may be set and changed based on a learning according to pre-set criteria. For example, when it is determined that a risk level of driving is high and a user input for controlling an operation of a module installed on a vehicle is not received within a certain time period, the electronic device 1000 may transmit a command for controlling an operation of the module installed on the vehicle to the module installed on the vehicle.

For example, when the type of an event is change of a terrain to a winding path ahead and a risk level of driving is medium, the electronic device 1000 may generate a notification message "there is a winding road ahead, so please be aware" including a notification of the event and an action guideline corresponding to the event.

For example, when the type of an event is a change of a road situation due to an accident vehicle ahead and a risk level of driving is low, the electronic device 1000 may generate a notification message "there is an accident vehicle ahead, so please change a lane to the right" including a notification of the event and an action guideline corresponding to the event.

For example, when the type of an event is a change of a traffic light from green to red and a risk level of driving is high, the electronic device 1000 may generate a notification message "a traffic light is changed, so please stop" including a notification of the event and an action guideline corresponding to the event.

For example, when the type of an event is a change of a traffic light from red to green and a risk level of driving is low, the electronic device 1000 may generate a notification message "a traffic light is changed, so please drive" including a notification of the event and an action guideline corresponding to the event.

Figure 6:
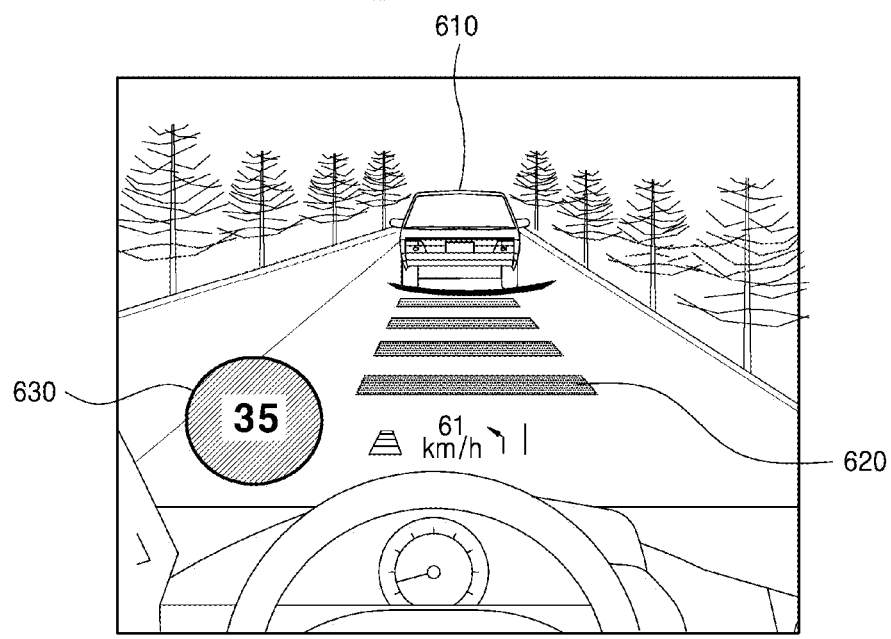
FIG. 6 is a diagram illustrating an example of outputting a notification message according to an embodiment.

FIG. 6 is a diagram illustrating an example of outputting a notification message according to an embodiment.

According to an embodiment, the electronic device 1000 may display a notification message on, for example, a head up display (HUD) of a vehicle.

For example, when the electronic device 1000 determines that an event in which an accident is anticipated due to an insufficient safety distance to a vehicle in front 610 has occurred and a risk level of driving 630 is 35, the electronic device 1000 may display a notification message including the risk level of driving 630 and a virtual image 620 for establishing a safety distance on a HUD of a vehicle. Furthermore, the electronic device 1000 may output a notification message including an alarm sound and an action guideline "please step on a brake immediately" corresponding to the event, in the form of voice. Furthermore, for example, when a step-on input for stepping on a brake is not received from a user within a certain time period after a notification message is output, the electronic device 1000 may transmit a command for controlling an operation of the brake to the brake. For example, the certain time period may be set based on learning and may vary depending on the risk level of driving 630. For example, the higher the risk level of driving 630 is, the smaller the certain time period may be set. For example, when a distance between the vehicle in front 610 and a user's vehicle is too small and an accident is expected without immediately stepping on a brake, a command for controlling the operation of the brake may be transmitted to the brake simultaneously as a notification message is output.

Figure 7:
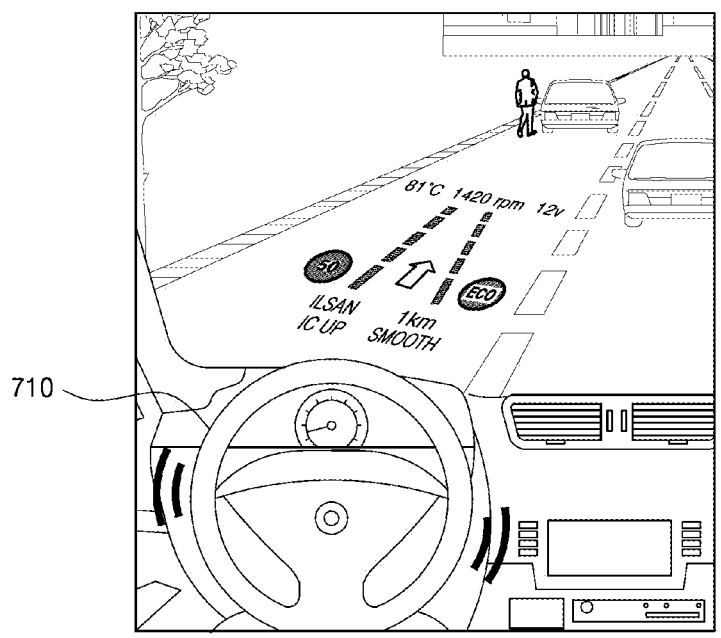
FIG. 7 is a diagram illustrating an example of outputting a notification message according to an embodiment.

FIG. 7 is a diagram illustrating an example of outputting a notification message according to an embodiment.

According to an embodiment, the electronic device 1000 may transmit a command for controlling an operation of a module installed on a vehicle to the module installed on the vehicle.

For example, when the electronic device 1000 determines that an event related to a road situation change making it impossible to drive along a certain lane due to vehicles being in an accident up ahead has occurred, the electronic device 1000 may display a pre-set notification message without a notification of the event on a HUD of a vehicle. For example, the electronic device 1000 may display a notification message that includes at least one of a current temperature, an rpm of a vehicle, a moving direction of the vehicle, a traffic situation, and a risk level of driving on the HUD. Furthermore, the electronic device 1000 may output a notification message "there are accident vehicles ahead, so please change a lane to the right" in the form of a voice. Furthermore, when a steering input for rotating a steering wheel 710 is not received from a user within a certain time period after a notification message is output in the form of a voice, for example, a command for rotating the steering wheel 710 may be transmitted to the steering wheel 710. Therefore, the electronic device 1000 may autonomously adjust a driving path by guiding a user to adjust the steering wheel 710 or transmitting a command for adjusting the steering wheel 710 to the steering wheel 710.

Figure 8:
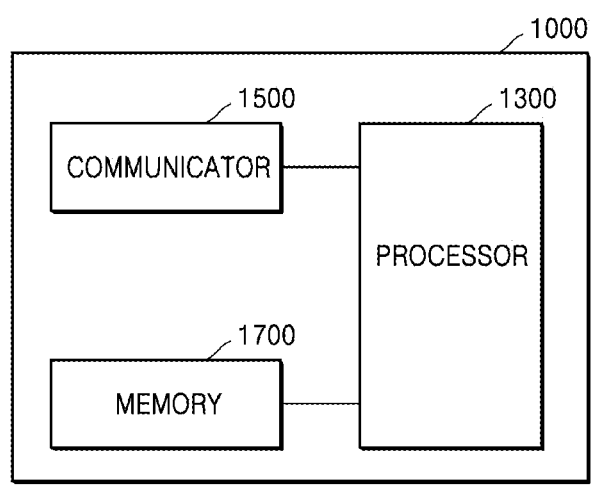
FIGS. 8 and 9 are block diagrams illustrating an electronic device according to some embodiments.
Figure 9:
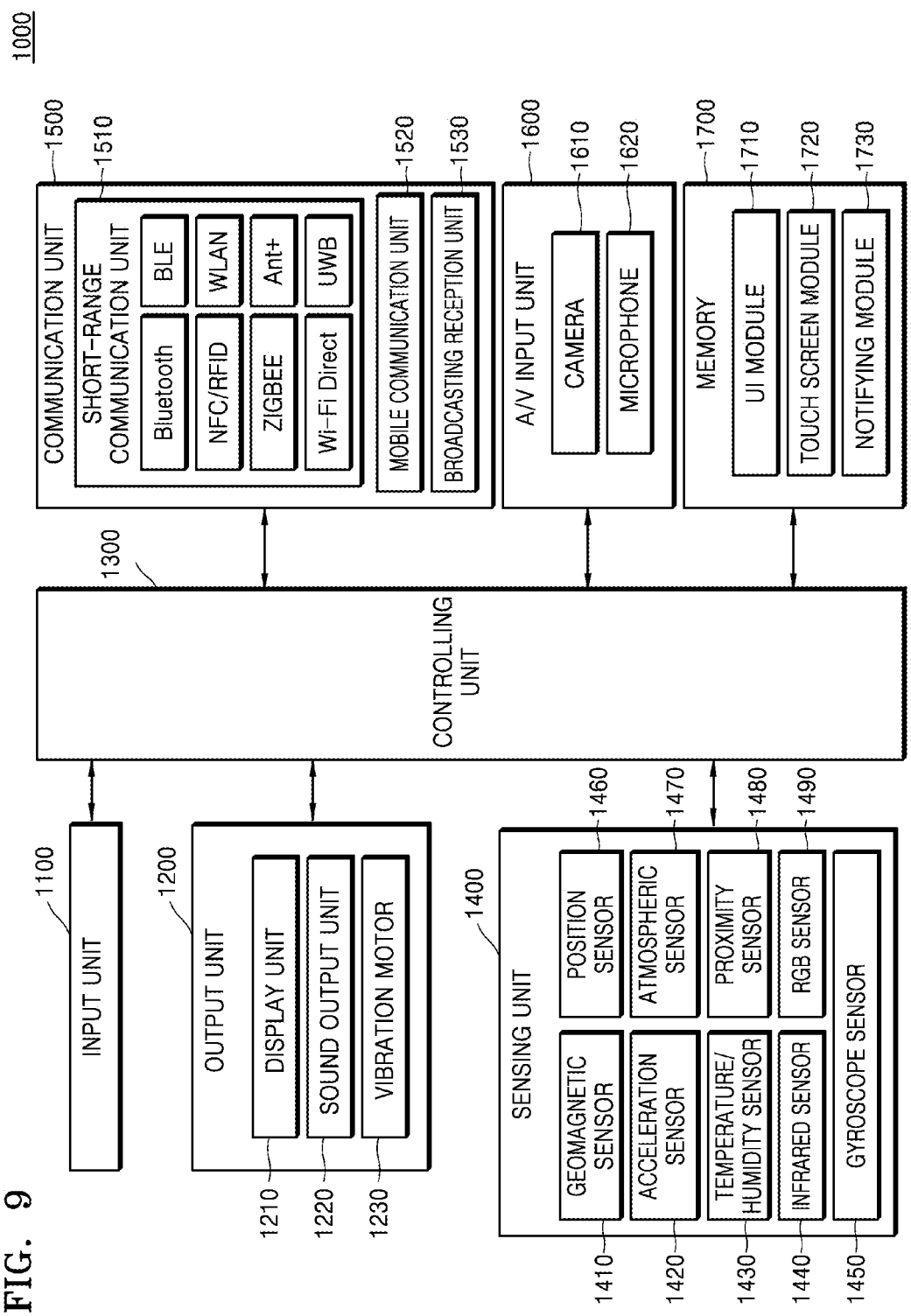

FIGS. 8 and 9 are block diagrams illustrating an example of the electronic device 1000 according to some embodiments.

As illustrated in FIG. 8, the electronic device 1000 according to an embodiment may include a processor (e.g., including processing circuitry) 1300, a communicator (e.g., including communication circuitry) 1500, and a memory 1700. However, not all of the components illustrated in FIG. 8 are necessary components of the electronic device 1000. The electronic device 1000 may be implemented by more components than the components illustrated in FIG. 8. The electronic device 1000 may also be implemented by fewer components than the components illustrated in FIG. 8.

For example, as illustrated in FIG. 9, the electronic device 1000 according to an embodiment may further include an input unit (e.g., including input circuitry) 1100, an output unit (e.g., including output circuitry) 1200, a sensing unit (e.g., including sensing circuitry) 1400, and an audio/video (A/V) input unit (e.g., including A/V input circuitry) 1600 in addition to the processor 1300, the communicator (communication unit) 1500, and the memory 1700.

For example, the electronic device 1000 according to an embodiment may be a vehicle dashboard including the processor 1300, the communicator 1500, and the memory 1700. The electronic device 1000 according to an embodiment may be a vehicle including at least one of the input unit 1100, the output unit 1200, the sensing unit 1400, and the A/V input unit 1600 in addition to the processor 1300, the communicator (communication unit) 1500, and the memory 1700.

The input unit 1100 may refer, for example, to a unit including various input circuitry with which a user inputs data for controlling the electronic device 1000. For example, the input unit 1100 may include various input circuitry, such as, for example, and without limitation, a key pad, a dome switch, a touch pad (a contact capacitance type, a pressure resistive type, an infrared ray detecting type, a surface acoustic wave propagating type, an integral tension measuring type, a piezo-effect type, etc.), a jog wheel, and a jog switch, or the like, but is not limited thereto.

The input unit 1100 may receive a user input for controlling an operation of a module installed on a vehicle.

The output unit 1200 may include various output circuitry that may output an audio signal, a video signal, or a vibration signal, or the like, and the output unit 1200 may include, for example, and without limitation, a display 1210, an acoustic (e.g., sound) output unit 1220, and a vibration motor 1230, or the like. According to an embodiment, the output unit 1200 may output a notification message in the form of an audio, a video, and/or vibration.

The display unit 1210 may include, for example, a display that displays information processed by the electronic device 1000. For example, the display 1210 may display a notification message in a head-up display (HUD) of a vehicle.

The acoustic (sound) output unit 1220 may include various circuitry that outputs audio data received from the communicator (communication unit) 1500 or stored in the memory 1700. The acoustic output unit 1220 also outputs acoustic signals associated with functions performed by the electronic device 1000 (e.g., a call signal reception tone, a message reception tones, a notification tone, etc.). For example, the acoustic output unit 1220 may output an alarm sound to notify that an event has occurred.

The processor 1300 may include various processing circuitry and typically controls the overall operation of the electronic device 1000. For example, the processor 1300 may control the overall operations of the input unit 1100, the output unit 1200, the sensing unit 1400, the communication unit 1500, and the A/V input unit by executing programs stored in the memory 1700. Furthermore, the processor 1300 may perform the functions of the electronic device 1000 described above with respect to FIGS. 1 through 13 by executing programs stored in the memory 1700. The processor 1300 may include various processing circuitry, such as, for example, and without limitation, at least one processor. The processor 1300 may include a plurality of processors or may include one integrated processor, depending on functions and roles of the processor 1300. According to an embodiment, the processor 1300 may include at least one processor for providing a notification message by executing at least one program stored in the memory 1700.

According to an embodiment, the processor 1300 may obtain a video sequence including a plurality of frames from a camera installed on a vehicle through the communicator 1500. According to an embodiment, the processor 1300 may transmit a command for controlling an operation of a module installed on the vehicle to the module installed on the vehicle through the communication unit 1500, based on the type of an event and a risk level of driving.

According to an embodiment, the processor 1300 may detect an object included in a plurality of frames. According to an embodiment, processor 1300 may obtain positional information regarding an object for each of the plurality of frames. The processor 1300 may determine positions of the object on the pixel-by-pixel basis. According to an embodiment, the processor 1300 may determine whether an event related to driving of a vehicle has occurred, by analyzing a time-series change of positions of the object in the plurality of frames. According to an embodiment, the processor 1300 may determine the type of the event and a risk level of driving by analyzing the time-series change of positions the object in the plurality of frames. According to an embodiment, processor 1300 may generate a notification message that notifies the event based on a determination of whether an event has occurred. According to an embodiment, the processor 1300 may generate a notification message that notifies the event based on the type of the event and a risk level of driving. According to an embodiment, the processor 1300 may control to output the generated notification message through the output unit 1200. According to an embodiment, the processor 1300 may control to display the generated notification message via the display unit 1210. According to an embodiment, the processor 1300 may perform detection of an object, obtaining of positional information regarding the object, determination of whether an event has occurred, and generation of a notification message using different learning models.

According to an embodiment, a first learning model may be generated by learning criteria for determining types of an object and criteria for determining positions of an object in a plurality of frames using, for example, a fully convolutional network (FCN). The processor 1300 may determine the type of an object and determine the positions of the object in the plurality of frames, by using the first learning model.

According to an embodiment, a second learning model may be generated by learning criteria for determining whether an event related to driving of a vehicle has occurred and criteria for determining the content of a notification message by analyzing time-series changes of positions of an object in a plurality of frames using, for example, a recurrent neural network (RNN). The processor 1300 may determine whether an event related to driving of a vehicle has occurred and determine the content of a notification message, by using the second learning model.

According to an embodiment, the processor 1300 may apply a filter to a plurality of frames to flatten lightening degrees of the plurality of frames to input the plurality of frames to the first learning model and reduce the dimension of an output of the first learning model to input the output to the second learning model.

The sensing unit 1400 may include various sensors (sensing circuitry) to sense a state of the electronic device 1000, a state of a user, or a state around the electronic device 1000 and transmit sensed information to the processor 1300.

The sensing unit 1400 may, for example, include, but is not limited to, at least one of a magnetic sensor 1410, an acceleration sensor 1420, a temperature/humidity sensor 1430, an infrared sensor 1440, a gyroscope sensor 1450, a position sensor (e.g., GPS) 1460, an atmospheric sensor 1470, a proximity sensor 1480, and an RGB sensor 1490. The function of each sensor may be intuitively deduced from the name thereof by one of ordinary skill in the art, and thus detailed description thereof will not be provided here.

The communication unit 1500 may include various communication circuitry including one or more components that enable the electronic device 1000 to communicate with another electronic device (not shown) and the server 2000. The other electronic device (not shown) may be, but is not limited to, a computing device or a sensing device. Furthermore, for example, the other electronic device may be a module included in a vehicle like the electronic device 1000. For example, the communication unit 1500 may include a short-range communication unit 1510, a mobile communication unit 1520, and a broadcast reception unit 1530.

The short-range communication unit 1510 may, for example, be, but is not limited to, a Bluetooth communicator, a Bluetooth low energy (BLE) communicator, a near field communicator/RF identification (RFID) communicator, a WLAN (Wi-Fi) communicator (not shown), a Zigbee communicator, an infrared data association (IrDA) communicator, a Wi-Fi direct (WFD) communicator, an ultra wideband (UWB) communicator, and an Ant+ communicator.

The mobile communication unit 1520 may include various mobile communication circuitry that transmits and receives a wireless signal to and from at least one of a base station, an external terminal, and a server on a mobile communication network. Here, the wireless signal may include various types of data associated with transmission/reception of a voice call signal, a video call signal, or a text/multimedia message.

The broadcast reception unit 1530 may include various broadcast receiving circuitry that receives a broadcast signal and/or broadcast-related information from the outside through a broadcast channel. The broadcast channel may include a satellite channel and a terrestrial channel. The electronic device 1000 may not include the broadcast reception unit 1530 according to some embodiments.

According to an embodiment, the communication unit 1500 may receive a video sequence including a plurality of frames from a camera installed on a vehicle. According to an embodiment, the communication unit 1500 may transmit a command for controlling an operation of the module installed on the vehicle to the module installed on the vehicle.

The A/V input unit 1600 is a unit for inputting an audio signal or a video signal and may include various A/V input circuitry, such as, for example, and without limitation, a camera 1610 and a microphone 1620. The camera 1610 may obtain an image frame, such as a still image or a moving picture, through an image sensor in a video call mode or a photographing mode. An image captured through the image sensor may be processed by the processor 1300 or a separate image processor (not shown). For example, an image captured by the camera 1610 may be utilized as information for determining whether an event has occurred.

The microphone 1620 may receive an external acoustic signal and processes the external acoustic signal into electrical voice data. For example, microphone 1620 may receive an acoustic signal from an external electronic device or a user. The microphone 1620 may use various noise reduction algorithms to remove noises generated while an external acoustic signal is being input.

The memory 1700 may store a program for data processing and controlling of the processor 1300 and may store data input to or output from the electronic device 1000.

The memory 1700 may include at least one of be a flash memory, a hard disk, a multimedia card micro, a card type memory (e.g., an SD memory or an XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc, or the like, but is not limited thereto.

Programs stored in the memory 1700 may be classified into a plurality of modules according to their functions. For example, programs stored in the memory 1700 may be classified into a UI module 1710, a touch screen module 1720, a notifying module 1730, The UI module 1710 may provide a dedicated UI or a dedicated GUI associated with the electronic device 1000 for each application. The touch screen module 1720 may sense a touch gesture on a user's touch screen and transmit information regarding the touch gesture to the processor 1300. The touch screen module 1720 according to an embodiment may recognize and analyze a touch code. The touch screen module 1720 may also be configured as separate hardware including a processor.

The notifying module 1730 may generate a signal for notifying an occurrence of an event. The notifying module 1730 may output a notification signal in the form of a video signal through the display 1210, may output a notification signal in the form of an audio signal through the acoustic output unit 1220, or may output a notification signal in the form of a vibration signal via the vibration motor 1230.

Figure 10:
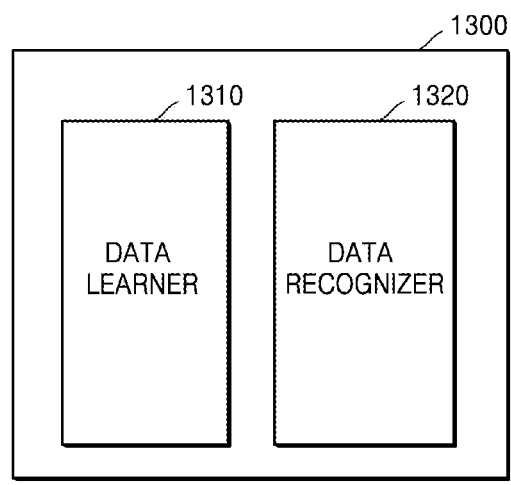
FIG. 10 is a block diagram illustrating a processor according to an embodiment.

FIG. 10 is a block diagram illustrating the processor 1300 according to an embodiment.

Referring to FIG. 10, the processor 1300 according to an embodiment may include a data learner (e.g., including processing circuitry and/or program elements) 1310 and a data recognizer (e.g., including processing circuitry and/or program elements) 1320.

The data learner 1310 may include various processing circuitry and/or program elements that learn criteria for obtaining pixel information and generating a notification message. The data learner 1310 may learn criteria regarding which data to use for obtaining pixel data and generating a notification message and also may learn criteria regarding how to obtain pixel information and generate a notification message by using data. The data learner 1310 may obtain data to be used for learning and applies the obtained data to a data recognition model to be described below, thereby learning criteria for obtaining pixel information and generating a notification message.

Although it has been described above with respect to FIGS. 1 through 9 that an operation for detecting an object, an operation for obtaining positional information regarding the object, an operation for determining the type of the object, an operation for determining a position of the object, an operation for determining whether an event has occurred, an operation for determining the type of the event, an operation for determining a risk level of driving, an operation for generating a notification message, and an operation for determining the content of the notification message as independent operations, the present disclosure is not limited thereto. At least two of the operations for detecting an object, the operation for obtaining positional information regarding the object, the operation for determining the type of the object, the operation for determining a position of the object, the operation for determining whether an event has occurred, the operation for determining the type of the event, the operation for determining a risk level of driving, the operation for generating a notification message, and the operation for determining the content of the notification message may be performed based on a learning according to pre-set criteria.

The data recognizer 1320 may include various processing circuitry and/or program elements that obtain pixel information and generate a notification message, based on data. The data recognizer 1320 may recognize pixel information and a notification messages from certain data using a learned data recognition model. The data recognizer 1320 may obtain certain data according to pre-set criteria based on learning and utilizes a data recognition model using the obtained data as input values thereto, thereby determining how to obtain pixel information and how to generate a notification message, based on certain data. Furthermore, a result value output by a data recognition model using obtained data as an input value may be used to update the data recognition model.

At least one of the data reader 1310 and the data recognizer 1320 may, for example, and without limitation, be fabricated in the form of at least one hardware chip and mounted on an electronic device. For example, at least one of the data learner 1310 and the data recognizer 1320 may be fabricated in the form of a dedicated hardware chip for artificial intelligence (AI) or may be fabricated as a portion of a general-purpose processor (e.g., a CPU or an application processor) or a graphics-only processor (e.g., a GPU) and may be mounted on the various electronic devices as described above.

In this case, the data learner 1310 and the data recognizer 1320 may be mounted on one electronic device or separate electronic devices. For example, one of the data learner 1310 and the data recognizer 1320 may be included in an electronic device, and the other one may be included in a server. Furthermore, the data learner 1310 and the data recognizer 1320 may be connected to each other via a wire or wirelessly, and thus the data learner 1310 may provide model information constructed by the data learner 1310 to the data recognizer 1320 and data input to the data recognizer 1320 may be provided to the data learner 1310 as additional learning data.

Meanwhile, at least one of the data reader 1310 and the data recognizer 1320 may be implemented as a software module including program elements. When at least one of the data learner 1310 and the data recognizer 1320 is implemented as a software module (or a program module including instructions), the software module may be stored in a non-transitory computer readable medium. Furthermore, in this case, at least one software module may be provided by an operating system (OS) or provided by a certain application. Some of at least one of the software modules may be provided by an OS, and the remaining of the at least one of software modules may be provided by a certain application.

Figure 11:
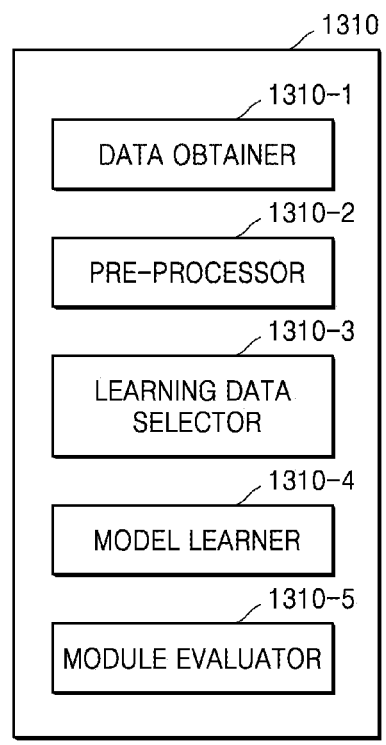
FIG. 11 is a block diagram illustrating a data learner according to an embodiment.

FIG. 11 is a block diagram illustrating the data learner 1310 according to an embodiment.

Referring to FIG. 11, the data learner 1310 according to some embodiments may include, for example, a data obtainer (e.g., including processing circuitry and/or program elements) 1310-1, a pre-processor (e.g., including processing circuitry and/or program elements) 1310-2, a learning data selector (e.g., including processing circuitry and/or program elements) 1310-3, a model learner (e.g., including processing circuitry and/or program elements) 1310-4, and a module evaluator (e.g., including processing circuitry and/or program elements) 1310-5.

The data obtainer 1310-1 may obtain data necessary for determining how to obtain pixel information and how to generate a notification message. The data obtainer 1310-1 may obtain necessary data for learning to determine of how to obtain pixel information and how to generate a notification message.

For example, the data obtainer 1310-1 may obtain voice data, image data, text data, or biometric signal data. For example, the data obtainer 1310-1 may receive data via an input device (e.g., a microphone, a camera, a sensor, etc.) of the electronic device 1000. The data obtainer 1310-1 may obtain data via another electronic device communicating with the electronic device 1000. Alternatively, the data obtainer 1310-1 may obtain data via a server communicating with the electronic device 1000.

For example, the data obtainer 1310-1 may receive a video sequence from a camera installed on a vehicle. Furthermore, for example, the data obtainer 1310-1 may receive a video sequence from a camera capable of photographing the periphery of the vehicle. Furthermore, for example, the data obtainer 1310-1 may obtain a video sequence from a camera provided in the electronic device 1000.

The pre-processor 1310-2 may preprocess obtained data, such that the obtained data may be used for learning to determine how to obtain pixel information and how to generate a notification message. The pre-processor 1310-2 may process the obtained data to a pre-set format, such that the obtained data may be used for learning to determine how to obtain pixel information and how to generate a notification message. For example, the pre-processor 1310-2 may perform pre-processing to apply a filter for flattening lightening degrees of a plurality of frames included in a video sequence to the plurality of frames.

The learning data selector 1310-3 may select data necessary for learning from preprocessed data. The selected data may be provided to the model learner 1310-4. The learning data selector 1310-3 may select data necessary for learning from the preprocessed data according to certain criteria for determining how to obtain pixel information and how to generate a notification message. Furthermore, the learning data selector 1310-3 may select data according to certain criteria that is pre-set based on learning by the model learner 1310-4, which will be described below.

The model learner 1310-4 may learn criteria regarding how to obtain pixel information and how to generate a notification message based on learning data. Furthermore, the model learner 1310-4 may learn criteria for selecting learning data to use for determining how to obtain pixel information and how to generate a notification message.

Furthermore, the model learner 1310-4 may learn a data recognition model used for determining how to obtain the pixel information and how to generate a notification message based on learning data, by using the learning data. In this case, the data recognition model may be a model constructed in advance. For example, the data recognition model may be a model constructed in advance based on basic learning data (e.g., a black box image of a vehicle).

A data recognition model may, for example, and without limitation, be constructed by taking a field of application of the data recognition model, a purpose of learning, or computing performance of a device into account. The data recognition model may be, for example, a model based on a neural network. For example, a model, such as, for example, and without limitation, a deep neural network (DNN), a recurrent neural network (RNN), a fully convolutional network (FCN), and/or a bidirectional recurrent deep neural network (BRDNN), or the like, may be used as the data recognition model, but the present disclosure is not limited thereto.

According to various embodiments, when there are a plurality of pre-constructed data recognition models, the model learner 1310-4 may determine a data recognition model of which input learning data is highly related to basic learning data as a data recognition model to learn. In this case, the basic learning data may be pre-classified according to data types, and data recognition models may be pre-constructed according to data types. For example, the basic learning data may be pre-classified according to various criteria, such as areas where the basic learning data is generated, time points at which the basic learning data is generated, sizes of the basic learning data, genres of the basic learning data, and creators of the basic learning data, The model learner 1310-4 may also learn a data recognition model using, for example, a learning algorithm including an error back-propagation or a gradient descent.

The model learner 1310-4 may learn a data recognition model through a supervised learning using, for example, learning data as an input value. Furthermore, the model learner 1310-4 may learn a data recognition model through unsupervised learning for determining criteria for determining how to obtain pixel information and how to generate a notification message by learning data types necessary for determining how to obtain pixel information and how to generate a notification message based on learning data. Furthermore, the model learner 1310-4 may learn a data recognition model through reinforced learning using feedback regarding whether a result of determining how to obtain pixel information and how to generate a notification message based on learning data is correct.

Furthermore, when the data recognition model is learned, the model learner 1310-4 may store the learned data recognition model. In this case, the model learner 1310-4 may store the learned data recognition model in a memory of the electronic device 1000 including the data recognizer 1320. The model learner 1310-4 may store the learned data recognition model in a memory of a server connected to the electronic device 1000 via a wired network or a wireless network.

In this case, the memory in which the learned data recognition model is stored may also store, for example, commands or data related to at least one other component of the electronic device 1000. Furthermore, the memory may store software and/or programs. The programs may include, for example, and without limitation, a kernel, a middleware, an application programming interface (API), and/or an application program (or "application"), or the like.

The module evaluator 1310-5 inputs evaluation data to a data recognition model and, when a recognition result based on the evaluation data does not satisfy certain criteria, the module evaluator 1310-5 may make the model learner 1310-4 to re-learn the data recognition model. In this case, the evaluation data may be pre-set data for evaluating the data recognition model.

For example, when the number or a ratio of evaluation data corresponding to inaccurate recognition results from among recognition results of the learned data recognition model with respect to evaluation data exceeds a preset critical value, the module evaluator 1310 may evaluate that certain criterion is not met. For example, when the certain criterion is defined as a ratio of 2% and the learned data recognition model outputs incorrect recognition results for evaluation data exceeding 20 out of a total of 1000 evaluation data, the module evaluator 1310-5 may evaluate that the learned data recognition model is inappropriate.

On the other hand, when there are a plurality of learned data recognition models, the module evaluator 1310-5 may evaluate whether each of the learned data recognition models satisfies a certain criterion and determine a learned data recognition model that satisfies the certain criterion as a final data recognition model. In this case, when there are a plurality of models satisfying the certain criterion, the module evaluator 1310-5 may determine any one or a certain number of models preset in the descending order of evaluation scores as final data recognition model(s).

Meanwhile, at least one of the data obtainer 1310-1, the pre-processor 1310-2, the learning data selector 1310-3, the model learner 1310-4, and the module evaluator 1310-4 in the data learner 1310 may be fabricated in the form of at least one hardware chip and mounted on an electronic device. For example, at least one of the data obtainer 1310-1, the pre-processor 1310-2, the learning data selector 1310-3, the model learner 1310-4, and the module evaluator 1310-5 may be fabricated as a dedicated hardware chip for artificial intelligence (AI) or as a portion of a general-purpose processor (e.g., a CPU or an application processor) or a graphics dedicated processor (e.g., a GPU) and mounted on the various electronic devices as described above.

Furthermore, the data obtainer 1310-1, the pre-processor 1310-2, the learning data selector 1310-3, the model learner 1310-4, and the module evaluator 1310-5 may be mounted on a single electronic device or may be respectively mounted on separate electronic devices. For example, some of the data obtainer 1310-1, the pre-processor 1310-2, the learning data selector 1310-3, the model learner 1310-4, and the module evaluator 1310-5 may be included in an electronic device, and the rest may be included in a server.

At least one of the data obtainer 1310-1, the pre-processor 1310-2, the learning data selector 1310-3, the model learner 1310-4, and the module evaluator 1310-5 may be implemented as a software module. When at least one of the data obtainer 1310-1, the pre-processor 1310-2, the learning data selector 1310-3, the model learner 1310-4, and the module evaluator 1310-5 is implemented as a software module (or a program module including instructions), the software module may be stored in a non-transitory computer readable medium. Furthermore, in this case, the at least one software module may be provided by an OS or provided by a certain application. Alternatively, some of the at least one software modules may be provided by an OS, and the rest of the at least one software modules may be provided by a certain application.

Figure 12:
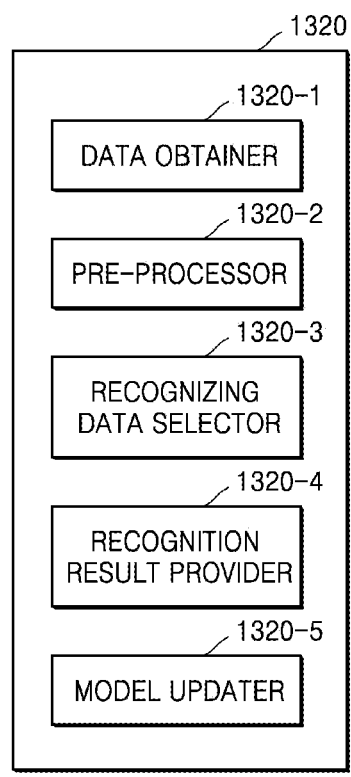
FIG. 12 is a block diagram illustrating a data recognizer according to an embodiment.

FIG. 12 is a block diagram illustrating the data recognizer 1320 according to an embodiment.

Referring to FIG. 12, the data recognizer 1320 according to an embodiment may include a data obtainer (e.g., including processing circuitry and/or program elements) 1320-1, a pre-processor (e.g., including processing circuitry and/or program elements) 1320-2, a recognizing data selector (e.g., including processing circuitry and/or program elements) 1320-3, a recognition result provider (e.g., including processing circuitry and/or program elements) 1320-4, and a model updater (e.g., including processing circuitry and/or program elements) 1320-5.

The data obtainer 1320-1 may obtain data necessary for determining how to obtain pixel information and how to generate a notification message based on learning data, and the pre-processor 1320-2 may pre-process obtained data, such that the obtained data may be used to determine how to obtain pixel information and how to generate a notification message. The pre-processor 1320-2 may process the obtained data to a pre-set format, such that the obtained data may be used by the recognition result provider 1320-4 to determine how to obtain pixel information and how to generate a notification message.

The recognizing data selector 1320-3 may select data necessary for determining how to obtain pixel information and how to generate a notification message from the pre-processed data. The selected data may be provided to the recognition result provider 1320-4. The recognizing data selector 1320-3 may select some or all of the preprocessed data according to pre-set criteria regarding how to obtain pixel information and certain criteria for how to generate a notification message. Furthermore, the recognizing data selector 1320-3 may select data according to pre-set criteria set based on a learning by the model learner 1310-4, which will be described below.

The recognition result provider 1320-4 may apply the selected data to a data recognition model and determine how to obtain pixel information and how to generate a notification message. The recognition result provider 1320-4 may provide recognition results according to purposes of data recognition. The recognition result provider 1320-4 may use data selected by the recognizing data selector 1320-3 as input values, thereby applying the selected data to a data recognition model. Furthermore, recognition results may be determined by the data recognition model.

The model updater 1320-5 may update a data recognition model based on evaluation of recognition results provided by the recognition result provider 1320-4. For example, the model updater 1320-5 may provide recognition results provided by the recognition result provider 1320-4 to the model reader 1310-4, so that the model learner 1310-4 updates the data recognition model.

Meanwhile, the data obtainer 1320-1, the pre-processor 1320-2, the recognizing data selector 1320-3, the recognition result provider 1320-4, and the model updater 1320-4 in the data recognizer 1320 may be fabricated in the form of at least one hardware chip and mounted on an electronic device. For example, at least one of the data obtainer 1320-1, the pre-processor 1320-2, the recognizing data selector 1320-3, the recognition result provider 1320-4, and the model updater 1320-5 may be fabricated as a dedicated hardware chip for artificial intelligence (AI) or as a portion of a general-purpose processor (e.g., a CPU or an application processor) or a graphics dedicated processor (e.g., a GPU) and mounted on the various electronic devices as described above.

Furthermore, the data obtainer 1320-1, the pre-processor 1320-2, the recognizing data selector 1320-3, the recognition result provider 1320-4, and the model updater 1320-5 may be mounted on a single electronic device or may be respectively mounted on separate electronic devices. For example, some of the data obtainer 1320-1, the pre-processor 1320-2, the recognizing data selector 1320-3, the recognition result provider 1320-4, and the model updater 1320-5 may be included in an electronic device, and the rest may be included in a server.

Furthermore, at least one of the data obtainer 1320-1, the pre-processor 1320-2, the recognizing data selector 1320-3, the recognition result provider 1320-4, and the model updater 1320-5 may be implemented as a software module. When at least one of the data obtainer 1320-1, the pre-processor 1320-2, the recognizing data selector 1320-3, the recognition result provider 1320-4, and the model updater 1320-5 is implemented as a software module (or a program module including instructions), the software module may be stored in a non-transitory computer readable medium. Furthermore, in this case, the at least one software module may be provided by an OS or provided by a certain application. Alternatively, some of the at least one software modules may be provided by an OS, and the rest of the at least one of software modules may be provided by a certain application.

Figure 13:
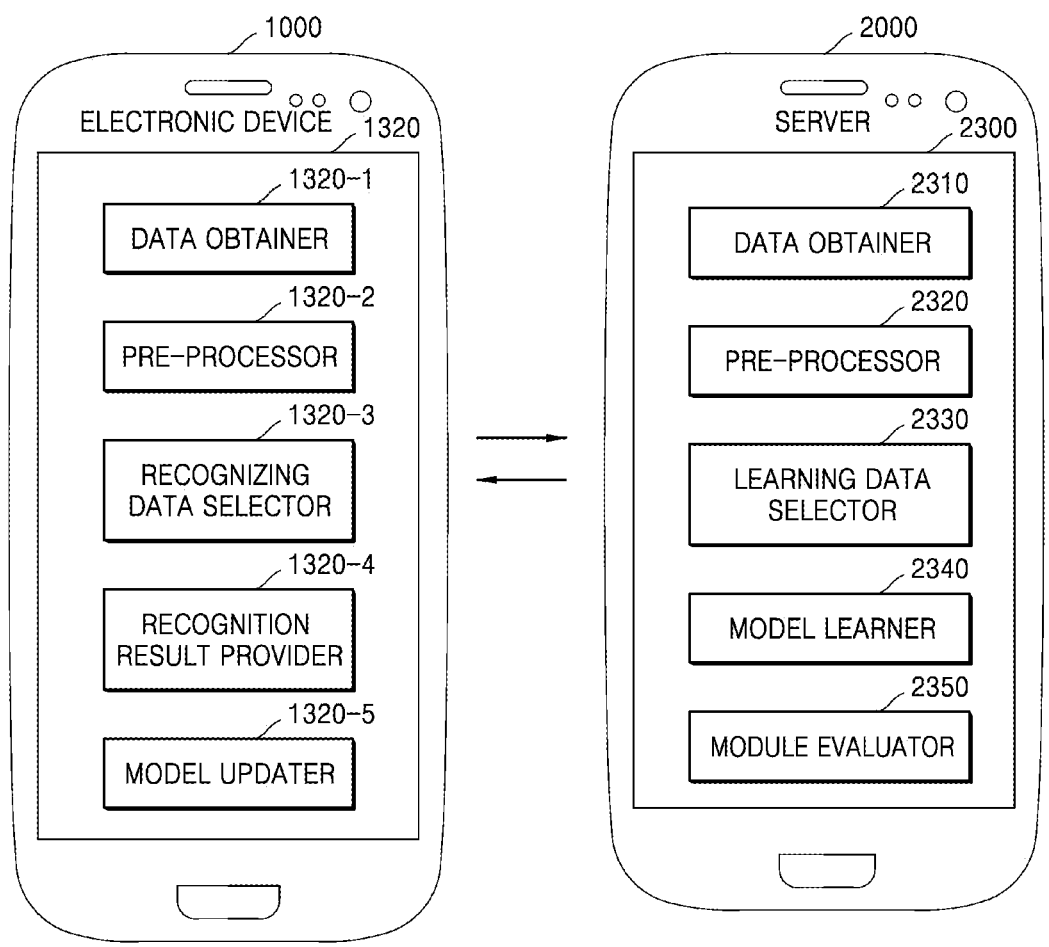
FIG. 13 is a diagram illustrating an example of learning and recognizing data as an electronic device operates in conjunction with a server, according to an embodiment.

FIG. 13 is a diagram illustrating an example of learning and recognizing data as the electronic device 1000 operates in conjunction with the server 2000, according to an embodiment.

Referring to FIG. 13, the server 2000 may learn criteria regarding how to obtain pixel information and how to generate a notification message. The electronic device 1000 may determine how to obtain pixel information and how to generate a notification message based on learning results of the server 2000. The server may include the functions of the data learner 1310 described above with reference to FIG. 11, and include, for example, a data obtainer 2310, a pre-processor 2320, a learning data selector 2330, a model learner 2340 and a model evaluator 2350, which correspond, for example, to similarly named elements of FIG. 11, and thus a detailed description thereof will not be repeated here.

In this case, a data learner 2300 of the server 2000 may perform the function of the data learner 1310 illustrated in FIG. 11. The data learner 2300 of the server 2000 may learn criteria regarding how to obtain pixel information, which data to use to determine how to generate a notification message, how to obtain the pixel information by using certain data, and how to generate the notification message. The data learner 2300 may obtain data to be used for learning and apply the obtained data to a data recognition model to be described below, thereby learning criteria regarding how to obtain pixel information and how to generate a notification message.

Furthermore, the recognition result provider 1320-4 of the electronic device 1000 may apply data selected by the recognizing data selector 1320-3 to a data recognition model generated by the server 2000 to determine how to obtain pixel information and how to generate a notification message. For example, the recognition result provider 1320-4 may transmit data selected by the recognizing data selector 1320-3 to the server 2000 and request the server 2000 to apply the data selected by the recognizing data selector 1320-3 to a data recognition model and determine how to obtain pixel information and how to generate a notification message. Furthermore, the recognition result provider 1320-4 may receive from the server 2000 information regarding how to obtain pixel information and how to generate a notification message determined by the server 2000.

The recognition result provider 1320-4 of the electronic device 1000 may receive a data recognition model generated by the server 2000 from the server 2000 and determine how to obtain pixel information and how to generate a notification message using the received data recognition model. In this case, the recognition result provider 1320-4 of the electronic device 1000 may apply data selected by the recognizing data selector 1320-3 to the data recognition model received from the server 2000, thereby determining how to obtain pixel information and how to generate a notification message.

Some embodiments may also be implemented in the form of a recording medium including instructions executable by a computer, such as a program module, executed by a computer. Computer readable medium may be any available medium that may be accessed by a computer and include both volatile and nonvolatile media and both removable and non-removable media. Furthermore, computer-readable media may also include computer storage media. Computer storage media may includes both volatile and nonvolatile media and both removable and non-removable media implemented in any method or technology for storage of information, such as computer readable instructions, data structures, program modules or other data.

Furthermore, in this specification, the term "-er", "-or", or "unit" may be a hardware component, such as a processor or a circuit, and/or a software component executed by the hardware component like a processor.

While the present disclosure has been illustrated and described with reference to various example embodiments thereof, it will be understood by those of ordinary skill in the art that various changes in form and details may be made therein without departing from the spirit and scope of the present disclosure as defined by the following claims. Hence, it will be understood that the example embodiments described above are merely illustrative and do not limit the scope of the present disclosure. For example, each component described in a single type may be executed in a distributed manner, and components described distributed may also be executed in an integrated form.

It should be understood that the claims and all modifications or modified forms drawn from the concept of the claims are included in the scope of the present disclosure.

What is claimed is:

1. An electronic device configured to control an operation of a vehicle, the electronic device comprising:
   a memory configured to store at least one program; and
   at least one processor configured to provide a notification message by executing the at least one program,
   wherein the at least one program includes instructions, which when executed by the processor, cause the electronic device to perform at least one operation comprising:
      obtaining a video sequence comprising a plurality of frames from a camera installed on the vehicle;
      detecting, from the plurality of frames, an object included in the plurality of frames via a first learning model;
      obtaining position information regarding the detected object with respect to each of the plurality of frames via the first learning model;
      determining whether an event related to driving of the vehicle has occurred by analyzing time-series changes in positions of the detected object in the plurality of frames via a second learning model;
      generating a notification message about the event based on a result of the determining via the second learning model; and
      outputting the generated notification message,
   wherein an input to the second learning model includes an output of the first learning model, the output of the first learning model including the position information regarding the detected object with respect to each of the plurality of frames.

2. The electronic device of claim 1, wherein the at least one program includes instructions, which when executed by the processor, cause the electronic device to perform at least one operation comprising the plurality of frames being input into the first learning model, and the position information output by the first learning model includes a group of pixels in each of the plurality of frames indicating the position of the detected object.

3. The electronic device of claim 1, wherein the determining of whether an event has occurred comprises:
   determining a type of the event; and
   determining a risk level of driving, and
   the generating of the notification message comprises generating the notification message based on the type of the event and the risk level of driving.

4. The electronic device of claim 3, wherein a command for controlling an operation of a module installed on the vehicle is transmitted to the module installed on the vehicle based on the type of the event and the risk level of driving.

5. The electronic device of claim 1, wherein the outputting of the notification message comprises displaying the notification message on a head-up display (HUD) of the vehicle.

6. The electronic device of claim 1, wherein the obtaining of the positional information regarding the object comprises determining positions of the object in the plurality of frames on a pixel-by-pixel basis.

7. The electronic device of claim 1, wherein the first learning model is generated using a fully convolutional network (FCN), by learning criteria for determining a type of the object from a plurality of different types of objects and learning criteria for determining positions of the object in the plurality of frames,
   the type of the object is determined using the first learning model in the detecting of the object, and
   positions of the object in the plurality of frames are determined with respect to the plurality of frames using the first learning model in the obtaining of the positional information regarding the object.

8. The electronic device of claim 1, wherein the input to the second learning model is obtained by reducing dimensions of the output of the first learning model.

9. The electronic device of claim 1, wherein the second learning model is generated using a recurrent neural network (RNN), by learning criteria for determining whether an event related to driving of a vehicle has occurred and learning criteria for determining the content of a notification message, and
   the generating of the notification message comprises, determining the content of the notification message using the second learning model.

10. The electronic device of claim 1, wherein the at least one program further comprises instructions for applying, to the plurality of frames, a filter for flattening lightening degrees of the plurality of frames to input the plurality of frames to the first learning model.

11. A method of controlling an operation of a vehicle, the method comprising:
    obtaining a video sequence comprising a plurality of frames from a camera installed on the vehicle;
    detecting, from the plurality of frames, an object included in the plurality of frames via a first learning model;
    obtaining position information regarding the detected object with respect to each of the plurality of frames via the first learning model;
    determining whether an event related to driving of the vehicle has occurred by analyzing time-series changes in positions of the detected object in the plurality of frames via a second learning model;
    generating a notification message about the event based on a result of the determining via the second learning model; and
    outputting the generated notification message,
    wherein an input to the second learning model includes an output of the first learning model, the output of the first learning model including the position information regarding the detected object with respect to each of the plurality of frames.

12. The method of claim 11, wherein the plurality of frames are input into the first learning model, and the position information output by the first learning model includes a group of pixels in each of the plurality of frames indicating the position of the detected object.

13. The method of claim 11, wherein the determining of whether an event has occurred comprises:
    determining a type of the event; and
    determining a risk level of driving, and
    the generating of the notification message comprises generating the notification message based on the type of the event and the risk level of driving.

14. The method of claim 13, wherein a command for controlling an operation of a module installed on the vehicle is transmitted to the module installed on the vehicle based on the type of the event and the risk level of driving.

15. The method of claim 11, wherein the obtaining of the positional information regarding the object comprises determining positions of the object in the plurality of frames on a pixel-by-pixel basis.

16. The method of claim 11, wherein the first learning model is generated using a fully convolutional network (FCN), by learning criteria for determining a type of the object from a plurality of different types of objects and learning criteria for determining positions of the object in the plurality of frames, the type of the object is determined using the first learning model in the detecting of the object, and positions of the object in the plurality of frames are determined with respect to the plurality of frames using the first learning model in the obtaining of the positional information regarding the object.

17. The method of claim 11, wherein the input to the second learning model is obtained by reducing dimensions of the output of the first learning model.

18. The method of claim 11, wherein the second learning model is generated using a recurrent neural network (RNN), by learning criteria for determining whether an event related to driving of a vehicle has occurred and learning criteria for determining the content of a notification message, and the generating of the notification message comprises, determining the content of the notification message using the second learning model.

19. The method of claim 11, further comprising:

applying, to the plurality of frames, a filter for flattening lightening degrees of the plurality of frames to input the plurality of frames to the first learning model.

20. A non-transitory computer readable recording medium having recorded thereon a computer program which, when executed by a processor, causes the processor to:

obtain a video sequence comprising a plurality of frames from a camera installed on a vehicle;

detect, from the plurality of frames, an object included in the plurality of frames using a first learning model;

obtain position information regarding the detected object with respect to each of the plurality of frames using the first learning model;

determine whether an event related to driving of the vehicle has occurred by analyzing time-series changes in positions of the detected object in the plurality of frames using a second learning model;

generate a notification message about the event based on a result of the determining using the second learning model; and output the generated notification message, wherein an input to the second learning model includes an output of the first learning model, the output of the first learning model including the position information regarding the detected object with respect to each of the plurality of frames.

* * * * *